US008861029B2

(12) United States Patent
Kishi

(10) Patent No.: US 8,861,029 B2
(45) Date of Patent: Oct. 14, 2014

(54) APPARATUS FOR GENERATING IMAGE CORRECTION DATA TO PERFORM GRADATION CORRECTION OF IMAGE, HAS CORRECTION DATA GENERATING UNIT THAT GENERATES IMAGE CORRECTION DATA ON IDENTIFIED COLOR VALUES OF PATCHES IN TEST AND REFERENCE CHARTS

(71) Applicant: KYOCERA Document Solutions Inc., Osaka (JP)

(72) Inventor: Yoshitaka Kishi, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/138,349

(22) Filed: Dec. 23, 2013

(65) Prior Publication Data

US 2014/0185068 A1 Jul. 3, 2014

(30) Foreign Application Priority Data

Dec. 27, 2012 (JP) ................................. 2012-284242

(51) Int. Cl.
*G06K 1/00* (2006.01)
*H04N 1/40* (2006.01)
*G03G 15/00* (2006.01)
*B41J 29/393* (2006.01)

(52) U.S. Cl.
CPC ................................. *H04N 1/40093* (2013.01)
USPC ............. 358/1.9; 358/3.1; 358/504; 358/461; 399/49; 347/19; 347/183; 347/188

(58) Field of Classification Search
None
See application file for complete search history.

(56) References Cited

U.S. PATENT DOCUMENTS

| 7,243,045 | B2 * | 7/2007 | Uwatoko et al. | 702/183 |
| 7,251,362 | B2 * | 7/2007 | Osawa et al. | 382/167 |
| 2010/0215392 | A1 * | 8/2010 | Shiraki et al. | 399/72 |

FOREIGN PATENT DOCUMENTS

| JP | 2006-222552 | 8/2006 |
| JP | 2010-226562 | * 10/2010 |

* cited by examiner

*Primary Examiner* — Steven Kau

(57) ABSTRACT

An image data acquiring unit 32 acquires image data of a chart sheet and a reference chart and image data of the white sheet from the external imaging device. A shading correcting unit 34 generates shading correction data on the basis of a white sheet, and performs shading correction for the image data of the chart sheet and the reference chart using the shading correction data. A projective transforming unit performs a projective transformation for the image data of the chart sheet and the reference chart. A color value identifying unit identifies color values of patches in a test chart printed on the chart sheet and color values of patches in the reference chart after the shading correction and the projective transformation. A correction data generating unit generates image correction data on the basis of the identified color values of patches in the test chart and the reference chart.

5 Claims, 8 Drawing Sheets

FIG. 2
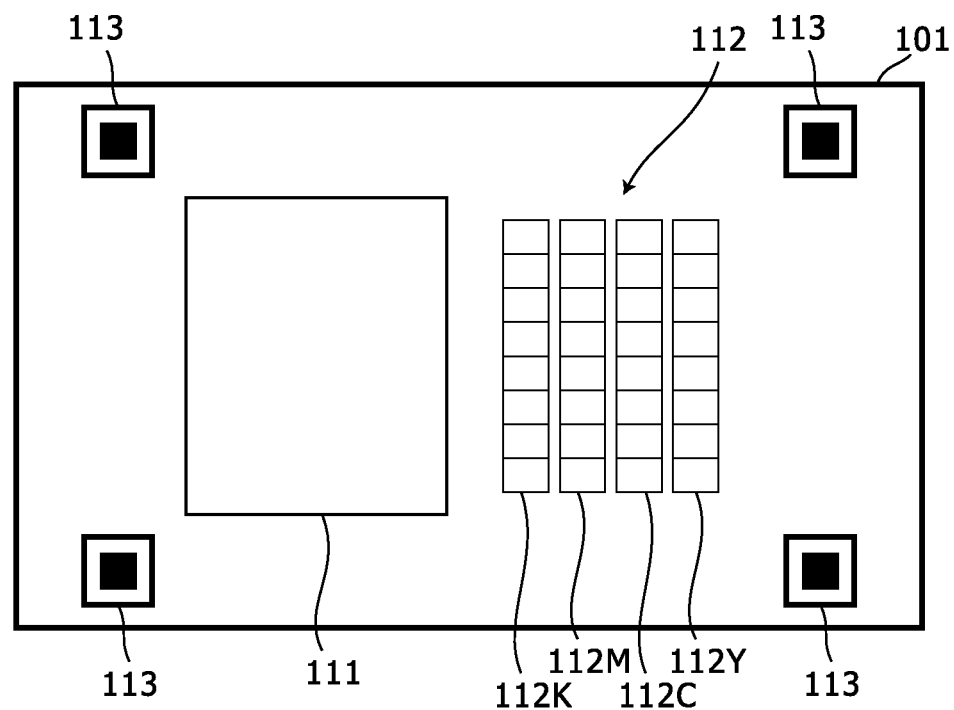
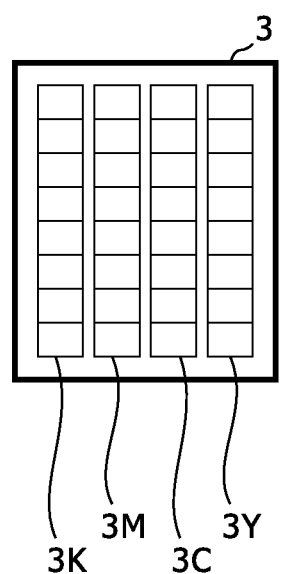

$$I = I_o \times \cos^4 \theta$$

I : ILLUMINANCE AT A POINT ON THE ANGLE $\theta$ FROM THE PROJECTIVE POINT

Io : ILLUMINANCE AT THE PROJECTIVE POINT

FIG. 4

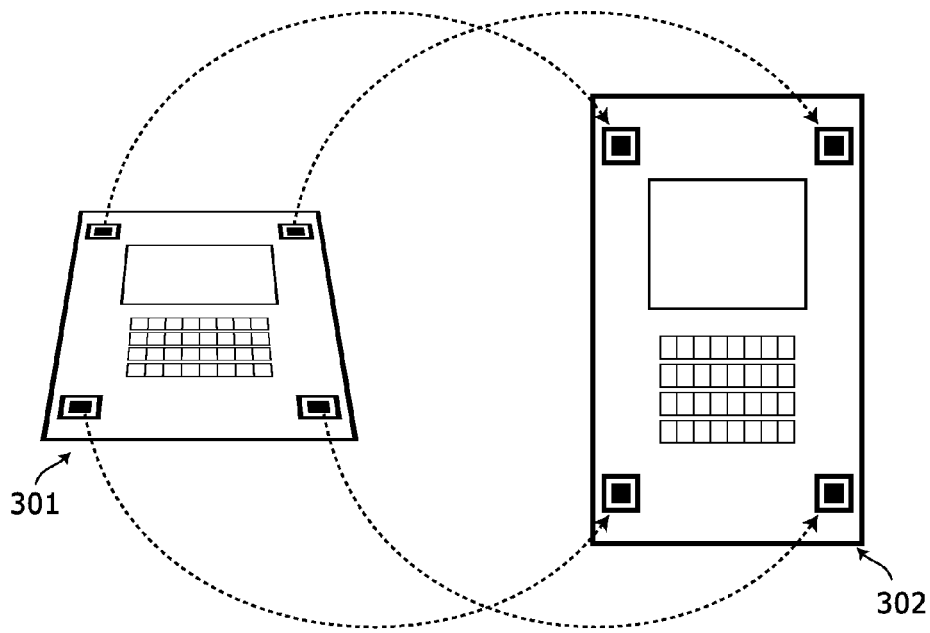

$$\begin{pmatrix} x' \\ y' \\ 1 \end{pmatrix} \cong H \times \begin{pmatrix} x' \\ y' \\ 1 \end{pmatrix} = \begin{pmatrix} a & b & c \\ d & e & f \\ g & h & 1 \end{pmatrix} \times \begin{pmatrix} x' \\ y' \\ 1 \end{pmatrix} \quad \ldots (1)$$

$$\begin{pmatrix} x1 & y1 & 1 & 0 & 0 & 0 & -x1 \times x1' & -y1 \times x1' \\ 0 & 0 & 0 & x1 & y1 & 1 & -x1 \times y1' & -y1 \times y1' \\ x2 & y2 & 1 & 0 & 0 & 0 & -x2 \times x2' & -y2 \times x2' \\ 0 & 0 & 0 & x2 & y2 & 1 & -x2 \times y2' & -y2 \times y2' \\ x3 & y3 & 1 & 0 & 0 & 0 & -x3 \times x3' & -y3 \times x3' \\ 0 & 0 & 0 & x3 & y3 & 1 & -x3 \times y3' & -y3 \times y3' \\ x4 & y4 & 1 & 0 & 0 & 0 & -x4 \times x4' & -y4 \times x4' \\ 0 & 0 & 0 & x4 & y4 & 1 & -x4 \times y4' & -y4 \times y4' \end{pmatrix} \times \begin{pmatrix} a \\ b \\ c \\ d \\ e \\ f \\ g \\ h \end{pmatrix} = \begin{pmatrix} x1' \\ y1' \\ x2' \\ y2' \\ x3' \\ y3' \\ x4' \\ y4' \end{pmatrix} \quad \ldots (2)$$

FIG. 8

$$\begin{pmatrix} x \\ y \\ z \end{pmatrix} = \begin{pmatrix} 0.436041 & 0.385113 & 0.143046 \\ 0.222485 & 0.716905 & 0.060610 \\ 0.013920 & 0.097067 & 0.713913 \end{pmatrix} \times \begin{pmatrix} R \\ G \\ B \end{pmatrix} \quad \cdots (3)$$

APPARATUS FOR GENERATING IMAGE CORRECTION DATA TO PERFORM GRADATION CORRECTION OF IMAGE, HAS CORRECTION DATA GENERATING UNIT THAT GENERATES IMAGE CORRECTION DATA ON IDENTIFIED COLOR VALUES OF PATCHES IN TEST AND REFERENCE CHARTS

CROSS-REFERENCE TO RELATED APPLICATIONS

This application relates to and claims priority rights from Japanese Patent Application No. 2012-284242, filed on Dec. 27, 2012, the entire disclosures of which are hereby incorporated by reference herein.

BACKGROUND

1. Field of the Present Disclosure

The present disclosure relates to an image correction data generating apparatus and an image correction data generating program.

2. Description of the Related Art

An image forming apparatus such as a printer or a multi function peripheral performs gamma correction for gradation of image data on the basis of image correction data corresponding to gradation characteristics of an internal printing device. Such gradation characteristics of the printing device change over years, and therefore, this image correction data is updated with performing calibration at a predetermined timing.

In a method (a first method) of the calibration, a test chart which includes plural test patches of different densities is formed on an image carrier on which a toner image is formed; densities of the patches are detected using a sensor; and image correction data is generated from the measurement values of the sensor.

In another method (a second method) of the calibration, test patches are printed on a recording medium; color values of the test patches in a test chart are measured using a reading device such as a scanner; and image correction data is generated from the measurement values.

Since image correction data is generated from colors printed on a recording medium in the second method, in general, the second method performs more precise calibration than the first method.

Since a printer does not include a built-in scanner, in general, the printer performs the calibration in the first method. However, a technique is proposed in which calibration is performed on the basis of image data obtained by an external imaging device such as a digital camera.

In an apparatus (a first apparatus), an RGB value of each patch in a test chart and a reference chart (a chart including patches of known densities) is determined from image data obtained by photographing the test chart and the reference chart using an external imaging device such as a digital camera; and image correction data (a correction formula) is generated from the RGB values of the patches.

Further, in another apparatus (a second apparatus), a test chart and a reference chart are separately photographed using an external imaging device such as a digital camera; and a difference between image data of the test chart and image data of the reference chart is set as a first correction value, and a difference between a measurement density value and a reference density value of each patch in the reference chart is set as second correction values, and the calibration is performed on the basis of these correction values.

However, in the aforementioned first and second apparatuses, due to the image data obtained by photographing the charts using an external imaging device such as a digital camera, RGB values of the image data obtained by photographing change due to changing photography conditions such as a light source and an ambient light. Consequently, it is difficult to precisely perform the calibration.

SUMMARY

An image correction data generating apparatus that generates image correction data to perform gradation correction of an image for a gradation characteristic of a printing device according to an aspect of the present disclosure, includes an image data acquiring unit, a shading correcting unit, a projective transforming unit, a color value identifying unit, and a correction data generating unit. The image data acquiring unit is configured (a1) to acquire image data of both a chart sheet on which a test chart is printed by the printing device and a predetermined reference chart from an external imaging device that photographs the chart sheet and the reference chart, and (a2) to acquire image data of a white sheet photographed by the external imaging device from the external imaging device. The shading correcting unit is configured (b1) to generate shading correction data on the basis of a distribution of pixel values in the image data of the white sheet, and (b2) to perform shading correction for the image data of the chart sheet and the reference chart using the shading correction data. The projective transforming unit is configured to perform a projective transformation for the image data of the chart sheet and the image data of the reference chart on the basis of markers on the chart sheet. The color value identifying unit is configured to identify color values of patches in the test chart and color values of patches in the reference chart on the basis of the image data of the chart sheet and the reference chart after the shading correction and the projective transformation. The correction data generating unit is configured to generate image correction data on the basis of the identified color values of patches in the test chart and the identified color values of patches in the reference chart.

A non-transitory computer readable recording medium according to an aspect of the present disclosure stores an image correction data generating program that causes a computer to generate image correction data to perform gradation correction of an image for a gradation characteristic of a printing device. The image correction data generating program causes the computer to act as an image data acquiring unit, a shading correcting unit, a projective transforming unit, a color value identifying unit, and a correction data generating unit. The image data acquiring unit is configured (a1) to acquire image data of both a chart sheet on which a test chart is printed by the printing device and a predetermined reference chart from an external imaging device that photographs the chart sheet and the reference chart, and (a2) to acquire image data of a white sheet photographed by the external imaging device from the external imaging device. The shading correcting unit is configured (b1) to generate shading correction data on the basis of a distribution of pixel values in the image data of the white sheet, and (b2) to perform shading correction for the image data of the chart sheet and the reference chart using the shading correction data. The projective transforming unit is configured to perform a projective transformation for the image data of the chart sheet and the reference chart on the basis of markers on the chart sheet. The color value identifying unit is configured to identify color values of patches in the test chart and color values of patches in the reference chart on the basis of the image data of the chart sheet and the reference chart after the shading correction and the projective transformation. The correction data generating unit is configured to generate image correction data on the basis of the identified color values of patches in the test chart and the identified color values of patches in the reference chart.

These and other objects, features and advantages of the present disclosure will become more apparent upon reading of the following detailed description along with the accompanied drawings.

BRIEF DESCRIPTION OF THE DRAWINGS

FIG. 2 shows a diagram which indicates an example of a chart sheet and a reference chart;

FIG. 4 shows a diagram which explains a projective transformation performed by the projective transforming unit in FIG. 1;

FIG. 8 shows a diagram which indicates a conversion formula between RGB values and XYZ values under a D50 light source.

DETAILED DESCRIPTION

Hereinafter, an embodiment according to an aspect of the present disclosure will be explained with reference to drawings.

Embodiment 1

Figure 1:
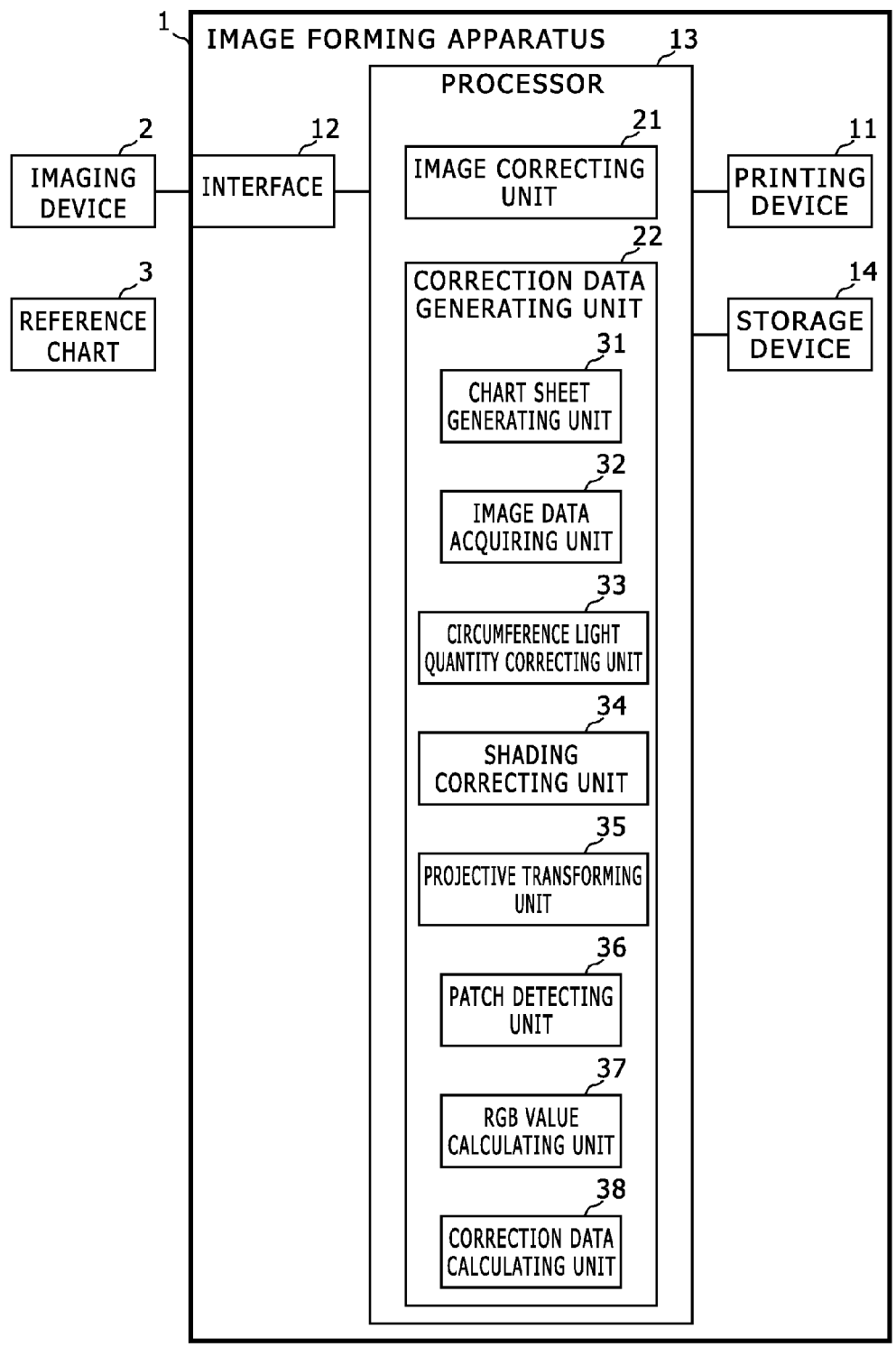
FIG. 1 shows a block diagram which indicates a configuration of an image correction data generating apparatus in Embodiment 1 of the present disclosure.

FIG. 1 shows a block diagram which indicates a configuration of an image correction data generating apparatus in Embodiment 1 of the present disclosure. The image correction data generating apparatus in Embodiment 1 is an image forming apparatus such as a printer.

The image forming apparatus 1 includes a printing device 11, an interface 12, a processor 13, and a storage device 14.

The printing device 11 is an internal device which prints an image based on image data after gradation correction. In this embodiment, the printing device 11 prints an image on a paper sheet using an electrographic method with toner of a predetermined colors (here, Cyan, Magenta, Yellow, and Black, hereinafter called as CMYK).

The interface 12 is a circuit which is connected to an external imaging device 2 in a wireless manner or a wired manner and performs data communication with the imaging device 2. A peripheral device interface, a network interface or the like is used as the interface 12. The imaging device 2 is a separate device from the image forming apparatus 1, and is a user portable device which photographs a photographic subject according to a user operation and generates image data of the photographic subject. For example, the imaging device 2 is a digital camera.

The processor 13 includes an ASIC (Application Specific Integrated Circuit), a computer, and so forth. This computer includes a CPU (Central Processing Unit), a RAM (Random Access Memory), a ROM (Read Only Memory) and other components, and loads programs to the RAM and executes the program with the CPU in order to form processing units.

The storage device 14 is a non volatile and rewritable storage device in which image correction data for gradation correction (so-called gamma correction) is stored. A flash memory or the like is used as the storage device 14.

The processor 13 forms an image correcting unit 21, and a correction data generating unit 22.

The image correcting unit 21 corrects gradation of image data using the image correction data for gradation correction stored in the storage device 14. In this embodiment, color conversion is performed from RGB image data to image data of toner colors (CMYK), and after the color conversion, gradation correction is performed for image data of each color of CMYK on the basis of image correction data of the color. Specifically, for each color of CMYK, image correction data is used corresponding to a gradation characteristic of a printing process of the color in the printing device 11.

In this embodiment, the correction data generating unit 22 is formed by executing an image correction data generating program that has been stored in the ROM, the storage device 14, or the like.

The correction data generating unit 22 causes the printing device 11 to print the chart sheet, and generates image correction data on the basis of image data of a photographed image of the chart sheet and the reference sheet 3 generated by the imaging device 2.

FIG. 2 shows a diagram which indicates an example of a chart sheet and a reference chart.

On the chart sheet 101 shown in FIG. 2, a reference chart frame 111 and a test chart 112, and markers 113 are printed.

The reference chart frame 111 is a position specifying image that indicates a position at which the reference chart 3 is to be placed when photographing the chart sheet 101.

The test chart 112 includes patch image arrays 112C, 112M, 112Y, and 112K of respective toner colors (CMYK). The patch image array 112i (i=C, M, Y, K) includes plural patch images, and the plural patch images are printed for plural density setting values different from each other. The patch images on the test chart 112 correspond to respective patch images on the reference chart 3.

The markers 113 are markers used for projective transformation of the photographed image, and are printed near respective four corners of the chart sheet 101 with a predetermined shape and a predetermined pattern.

The reference sheet 3 is a sheet on which patch image arrays 3C, 3M, 3Y, and 3K of respective toner colors (CMYK) have been printed, and the patch image array 3i (i=C, M, Y, K) includes plural patch images that have predetermined densities different from each other. Each one of the patch images has been printed so as to have the precise predetermined density.

For example, on the reference chart 3, eight patch images are printed at precise densities of 12.5%, 25%, 37.5%, 50%, 62.5%, 75%, 87.5%, and 100%, and on the test chart 112, these densities are specified as the density setting values to print patch images. However, densities of patch images actually printed have errors corresponding to current status of the printing process, and consequently, the densities of the patch images on the test chart 112 are different from the densities of the patch images on the reference chart 3.

Returning to FIG. 1, the correction data generating unit 22 includes a chart sheet generating unit 31, an image data acquiring unit 32, a circumference light quantity correcting unit 33, a shading correcting unit 34, a projective transforming unit 35, a patch detecting unit 36, an RGB value calculating unit 37, and a correction data calculating unit 38.

The chart sheet generating unit 31 causes the printing device 11 to print the chart sheet 101. Image data of the chart sheet 101 has been stored in the storage device 14.

A user puts the reference chart 3 on the chart sheet 101, and takes a photograph of the reference chart 3 and the chart sheet 101 using the imaging device 2. In addition, at this time, the user takes a photograph of a white sheet (a paper sheet that has a uniform white color over the whole area) under the same photography condition (light source and so forth) as the photography condition of the reference chart 3 and the chart sheet 101.

The image data acquiring unit 32 acquires image data of the photographed image of the chart sheet 101 and the reference chart 3 from the imaging device 2 using the interface 12. Further, the image data acquiring unit 32 acquires image data of the photographed image of the white sheet from the imaging device 2.

The circumference light quantity correcting unit 33 identifies a distribution of pixel values of the image data of the white sheet, and corrects circumference light quantity of the photographed image so as to make the whole area of the photographed image of the white sheet have a uniform brightness.

Figure 3:
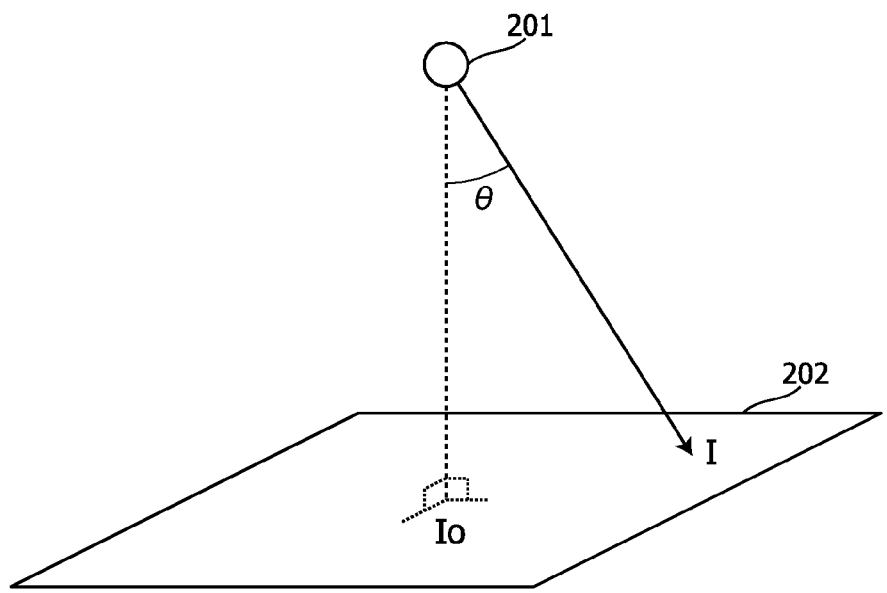
FIG. 3 shows a diagram which explains circumference light decline.

FIG. 3 shows a diagram which explains circumference light decline. For example, as shown in FIG. 3, in an illuminance distribution pattern due to light from a positional light source 201 to an irradiation plane 202, circumference light quantity declines, and therefore, when photographing the irradiation plane 202, brightness of the photographed image is not uniform.

The shading correcting unit 34 generates shading correction data on the basis of the correction amounts that the circumference light quantity correcting unit 33 obtains of pixels at respective positions in the photographed image (i.e. on the basis of a distribution of pixel values in the image data of the white sheet). The shading correction data is data that indicates a distribution of the correction amounts in the photographed image. The correction value is a ratio (or a difference) between a brightness of each pixel and the largest brightness in the photographed image of the white sheet.

Further, the shading correcting unit 34 performs shading correction for the image data of both the chart sheet 101 and the reference chart 3 using the shading correction data. Specifically, a brightness of each pixel in the photographed image of the chart sheet 101 and the reference chart 3 are corrected on the basis of the shading correction data.

The projective transforming unit 35 searches for images of the markers 113 in the photographed image of the chart sheet 101 after shading correction, and performs a projective transformation of the photographed image of the chart sheet 101 and the reference chart 3 (i.e. for the image data of the chart sheet 101 and the image data of the reference chart 3) on the basis of positions of the markers 113 in the photographed image.

FIG. 4 shows a diagram which explains a projective transformation performed by the projective transforming unit in FIG. 1. As shown in FIG. 4, by the projective transformation according to the formula (1) and the equation (2), an image 301 of the chart sheet 101 in the photographed image is transformed to a parallelly facing status such as the image 302 (i.e. a rectangle shape as a similar figure to the chart sheet 101).

In the formula (1), x' and y' are a position of an image of the marker 113 before the transformation, x and y are a position of an image of the marker 113 after the transformation, and H is a projective transformation matrix. Since the four markers 113 satisfy the formula (1), the projective transformation matrix is obtained by solving the simultaneous equations (2). Subsequently, the inverse matrix of this projective transformation matrix is derived and applied to the photographed image to perform the projective transformation.

The patch detecting unit 36 identifies positions of respective patches of the test chart 112 and positions of respective patches of the reference chart 3 in the photographed image after shading correction and projective transformation. For example, from positions of the reference chart frame 111 and the markers 113, positions of the test chart 112 and the reference chart 3 are identified, and subsequently positions of respective patches of the test chart 112 and the reference chart 3 are identified.

The RGB value calculating unit 37 identifies RGB values of respective patches on the basis of positions of the patches identified by the patch detecting unit 36.

For example, the RGB value calculating unit 37 identifies an average value of RGB values in a whole area of a patch as RGB value of the patch.

The correction data calculating unit 38 generates image correction data on the basis of the RGB values of patches in the test chart 112 and the RGB values of patches in the reference chart 3 identified by the RGB value calculating unit 37.

In this embodiment, the correction data generating unit 38 generates first correction data and second correction data as the image correction data. The first correction data is generated on the basis of the RGB values of patches in the test chart 112 and the corresponding RGB values of patches in the reference chart 3. The second correction data is generated on the basis of the RGB values of patches in the reference chart 3 and reference densities of the patches in the reference chart 3.

Therefore, the first correction data indicates a relationship between color values of the test chart 112 and color values of the reference chart 3 under a photography condition, and the second correction data indicates a relationship between the color values of the reference chart 3 and the reference densities of the reference chart 3 under the photography condition. Consequently, by applying both of the first correction data and the second correction data to image data of an image to be printed, the image is printed so as to have proper colors according to the reference densities.

Here, for each color of CMYK, the first correction data and the second correction data are generated.

In the following part, a calibration action of the aforementioned image forming apparatus is explained.

Firstly, a user causes the printing device 11 to print the chart sheet 101 by operating the image forming apparatus 1. Subsequently, the user puts the reference chart 3 onto the reference chart frame 101 of the chart sheet 101. Under this situation, the user takes a photograph of the reference chart 3 and the chart sheet 101 by operating the imaging device 2. Consequently, image data of the photographed image of the reference chart 3 and the chart sheet 101 is generated and stored in the imaging device 2. Further, the user replaces the reference chart 3 and the chart sheet 101 with the white sheet, and takes a photograph of the white sheet under the same environmental light condition. Consequently, image data of the photographed image of the white sheet is generated and stored in the imaging device 2. The reference chart 3 and the chart sheet 101, and the white sheet may be photographed in the inverse order.

Subsequently, the user causes to generate image correction data in the following manner by operating the image forming apparatus 1.

Figure 5:
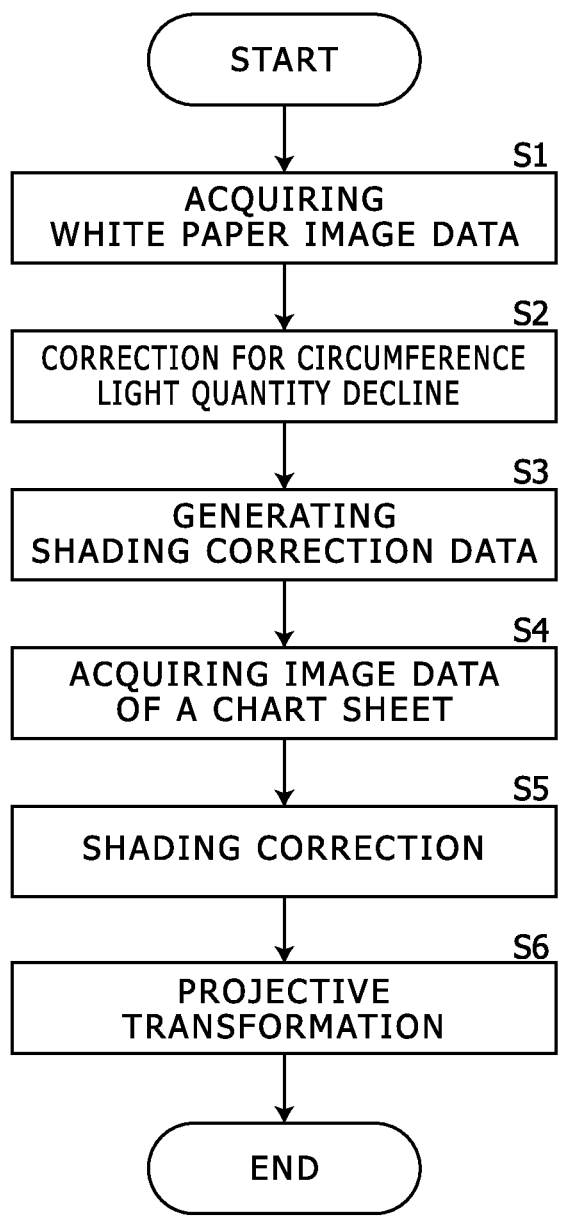
FIG. 5 shows a flowchart which explains shading correction and a projective transformation performed by the correction data generating unit in FIG. 1.
Figure 6:
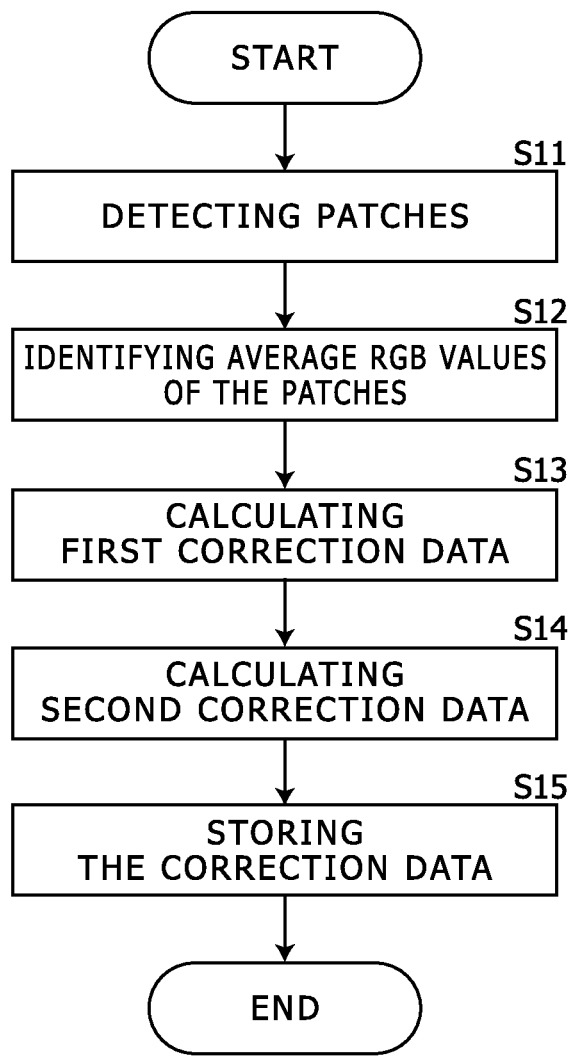
FIG. 6 shows a flowchart which explains generating image correction data by the correction data generating unit in FIG. 1.

FIG. 5 shows a flowchart which explains shading correction and a projective transformation performed by the correction data generating unit 22 in FIG. 1. FIG. 6 shows a flowchart which explains generating image correction data by the correction data generating unit 22 in FIG. 1.

Firstly, the image data acquiring unit 32 acquires image data of the photographed image of the white sheet from the imaging device 2 (Step S1).

Subsequently, the circumference light quantity correcting unit 33 corrects circumference light quantity of the photographed image so as to make the whole area of the photographed image of the white sheet have a uniform brightness (Step S2). The shading correcting unit 34 generates shading correction data on the basis of the correction amounts that the circumference light quantity correcting unit 33 obtains of pixels at respective positions in the photographed image (Step S3).

The image data acquiring unit 32 acquires image data of the photographed image of both the chart sheet 101 and the reference chart 3 from the imaging device 2 (Step S4).

Subsequently, the shading correcting unit 34 performs shading correction for the image data of the chart sheet 101 and the reference chart 3 using the shading correction data (Step S5).

The projective transforming unit 35 performs a projective transformation of the photographed image of the chart sheet 101 and the reference chart 3 after the shading correction (Step S6).

The aforementioned processes results in the photographed image of the chart sheet 101 and the reference chart 3 that is not dependent on the photography condition (a light source, a photographing angle and so forth).

Subsequently, the patch detecting unit 36 identifies positions of respective patches of the test chart 112 and positions of respective patches of the reference chart 3 in the photographed image after the shading correction and the projective transformation (Step S11).

The RGB value calculating unit 37 identifies RGB values of respective patches on the basis of positions of the patches identified by the patch detecting unit 36 (Step S12).

Figure 7:
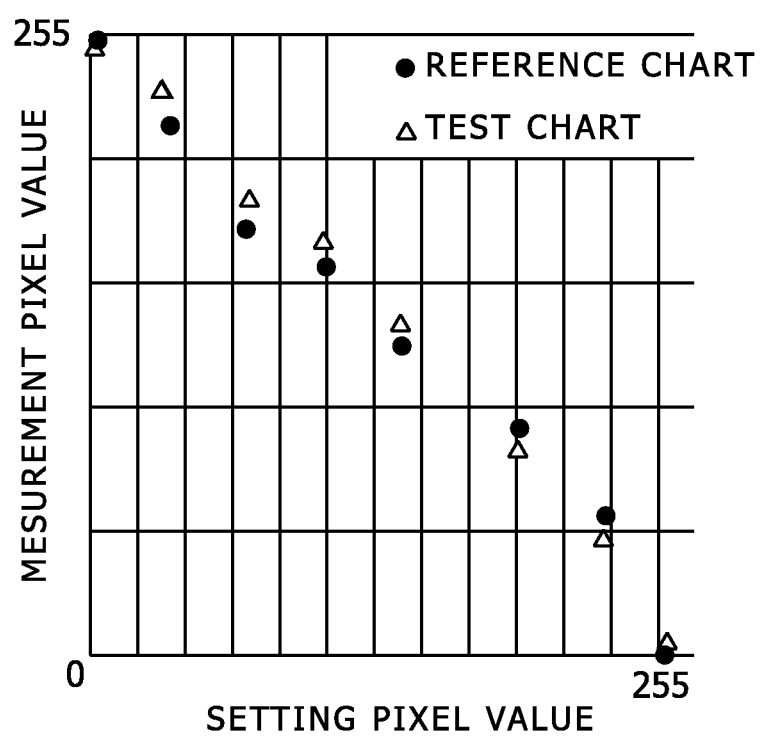
FIG. 7 shows a diagram which indicates an example of pixel values of a reference chart and a test chart acquired by the correction data generating unit in FIG. 1.

FIG. 7 shows a diagram which indicates an example of pixel values of a reference chart and a test chart acquired by the correction data generating unit 22 in FIG. 1.

The correction data generating unit 38 generates the first correction data on the basis of differences between the RGB values of patches in the test chart 112 and the corresponding RGB values of patches in the reference chart 3 (Step S13).

Specifically, the correction data generating unit 38 identifies input-output relationships of gamma correction of respective colors of CMYK for densities of respective patches, and performs a point addition process using spline interpolation or the like for other densities than the densities of the patches, and consequently identifies input-output relationships of gamma correction of the whole density range (e.g. 0 to 255 in case of 8-bit data).

Further, the correction data generating unit 38 generates the second correction data on the basis of differences between the RGB values of patches in the reference chart 3 and reference densities of the patches in the reference chart 3 (Step S14).

Specifically, the correction data generating unit 38 derives XYZ values of respective patches in the reference chart 3 from the RGB values, for example, according to the formula (3) shown in FIG. 8, and generates the second correction data on the basis of XYZ values of the reference densities of the respective patches and the XYZ values of respective patches in the reference chart 3. The XYZ values of the reference densities have been stored in the storage device 14. Specifically, for each patch, input-output relationships of gamma correction is identified so that the derived XYZ values is equal to XYZ values of the reference density. It should be noted that for the second correction data, by performing a point addition process as well, input-output relationships of gamma correction of the whole density range are identified. FIG. 8 shows a diagram which indicates a conversion formula between RGB values and XYZ values under a D50 light source.

Finally, the correction data calculating unit 38 stores the generated first and second correction data in the storage device 14 (Step S15).

In the aforementioned Embodiment 1, the image data acquiring unit 32 (a1) acquires image data of both the chart sheet 101 and the predetermined reference chart 3 from the external imaging device 2 that photographs the chart sheet 101 and the reference chart 3, and (a2) acquires image data of the white sheet photographed by the external imaging device 2 from the external imaging device 2. The shading correcting unit 34 (b1) generates shading correction data on the basis of a distribution of pixel values in the image data of the white sheet, and (b2) performs shading correction for the image data of the chart sheet 101 and the reference chart 3 using the shading correction data. The projective transforming unit 35 performs a projective transformation for the image data on the basis of the markers 113 on the chart sheet 101.

Further, the patch detecting unit 36 and the RGB value calculating unit 37 identify color values of patches in the test chart 112 printed on the chart sheet 101 and color values of patches in the reference chart 3 on the basis of the image data after the shading correction and the projective transformation. The correction data generating unit 38 generates image correction data on the basis of the identified color values of patches in the test chart 112 and the identified color values of patches in the reference chart 3.

Therefore, precise correction data is generated even using the external imaging device 2, and consequently, a precise calibration can be performed suitable to current printing characteristics of the printing device.

Embodiment 2

The correction data generating unit 22 is included in the image forming apparatus 1 in Embodiment 1; but in Embodiment 2, a correction data generating program to form the correction data generating unit 22 is installed from a computer readable recording medium into a storage medium of a host device (e.g. personal computer) capable of performing data communication with the image forming apparatus 1, and the correction data generating unit 22 is formed in the host device.

The host device 22 causes the image forming apparatus 1 to print the chart sheet 101, acquires image data of the photographed image from the imaging device 2, generates image correction data as well as that in Embodiment 1, transmits it to the image forming apparatus 1, and causes the image forming apparatus 1 to store it in the storage device 14.

In Embodiment 2, the correction data generating unit 22 may not be required in the image forming apparatus 1.

In the aforementioned Embodiment 2, it is possible that the image correction data is generated in another device than the image forming apparatus 1 and introduced into the image forming apparatus 1.

The description has been presented for purposes of illustration and description, and is not intended to be exhaustive or limited to the present disclosure.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image correction data generating apparatus that generates image correction data to perform gradation correction of an image for a gradation characteristic of a printing device, comprising:
    an image data acquiring unit configured (a1) to acquire image data of both a chart sheet on which a test chart is printed by the printing device and a predetermined reference chart from an external imaging device that photographs the chart sheet and the reference chart, and (a2) to acquire image data of a white sheet photographed by the external imaging device from the external imaging device;
    a shading correcting unit configured (b1) to generate shading correction data on the basis of a distribution of pixel values in the image data of the white sheet, and (b2) to perform shading correction for the image data of the chart sheet and the reference chart using the shading correction data;
    a projective transforming unit configured to perform a projective transformation for the image data of the chart sheet and the reference chart on the basis of markers on the chart sheet;
    a color value identifying unit configured to identify color values of patches in the test chart and color values of patches in the reference chart on the basis of the image data of the chart sheet and the reference chart after the shading correction and the projective transformation; and
    a correction data generating unit configured to generate image correction data on the basis of the identified color values of patches in the test chart and the identified color values of patches in the reference chart.

2. The image correction data generating apparatus according to claim 1 wherein:
    the correction data generating unit is further configured to generate first correction data and second correction data as the image correction data;
    the first correction data is generated on the basis of the color values of patches in the test chart and the color values of patches in the reference chart; and
    the second correction data is generated on the basis of the color values of patches in the reference chart and reference densities of the patches in the reference chart.

3. The image correction data generating apparatus according to claim 1 further comprising a chart sheet generating unit configured to cause the printing device to print the chart sheet.

4. The image correction data generating apparatus according to claim 1 wherein:
    a position specifying image is printed in the chart sheet;
    the position specifying image indicates a position at which the reference chart is to be placed; and
    the color value identifying unit is further configured to identify a position of an image of the reference chart on the basis of a position of the position specifying image.

5. A non-transitory computer readable recording medium storing an image correction data generating program that causes a computer to generate image correction data to perform gradation correction of an image for a gradation characteristic of a printing device, the image correction data generating program causing the computer to act as:
    an image data acquiring unit configured (a1) to acquire image data of both a chart sheet on which a test chart is printed by the printing device and a predetermined reference chart from an external imaging device that photographs the chart sheet and the reference chart, and (a2) to acquire image data of a white sheet photographed by the external imaging device from the external imaging device;
    a shading correcting unit configured (b1) to generate shading correction data on the basis of a distribution of pixel values in the image data of the white sheet, and (b2) to perform shading correction for the image data of the chart sheet and the reference chart using the shading correction data;
    a projective transforming unit configured to perform a projective transformation for the image data of the chart sheet and the reference chart on the basis of markers on the chart sheet;
    a color value identifying unit configured to identify color values of patches in the test chart and color values of patches in the reference chart on the basis of the image data of the chart sheet and the reference chart after the shading correction and the projective transformation; and
    a correction data generating unit configured to generate image correction data on the basis of the identified color values of patches in the test chart and the identified color values of patches in the reference chart.

* * * * *